United States Patent [19]

Baker

[11] Patent Number: 5,332,773

[45] Date of Patent: Jul. 26, 1994

[54] HIGHLY FILLED THERMOPLASTIC CARPET PRECOAT COMPOSITIONS

[75] Inventor: Franklin R. Baker, Wilmington, Del.

[73] Assignee: E. I. Du Pont de Nemours and Company, Wilmington, Del.

[21] Appl. No.: 113,917

[22] Filed: Sep. 1, 1993

Related U.S. Application Data

[63] Continuation of Ser. No. 784,244, Oct. 29, 1991, abandoned.

[51] Int. Cl.$^5$ .......................... C08K 5/09; C08K 3/30; C08K 3/26; C08L 31/04
[52] U.S. Cl. .................................. 524/322; 524/423; 524/427; 524/484; 524/485; 524/486; 524/563; 524/915
[58] Field of Search ............... 524/322, 423, 425, 427, 524/484, 485, 486, 563, 915

[56] References Cited

U.S. PATENT DOCUMENTS

| | | | |
|---|---|---|---|
| 3,583,936 | 6/1971 | Stahl | 524/480 |
| 3,684,600 | 8/1972 | Smedberg | 156/93 |
| 4,191,798 | 3/1980 | Schumacher | 524/425 |
| 4,338,227 | 7/1982 | Ballard | 524/271 |
| 4,379,190 | 4/1983 | Schenk | 524/425 |
| 4,434,258 | 2/1984 | Schumacher et al. | 524/423 |
| 4,434,261 | 2/1984 | Brugel et al. | 524/425 |
| 4,472,545 | 9/1984 | Coughlin et al. | 524/425 |
| 4,497,941 | 2/1985 | Aliani et al. | 524/563 |
| 4,613,632 | 9/1986 | Aliani et al. | 524/563 |

FOREIGN PATENT DOCUMENTS 0348200 12/1989 European Pat. Off. .
WO9114750 10/1991 PCT Int'l Appl. .

*Primary Examiner*—Paul R. Michl
*Assistant Examiner*—Peter Szekely
*Attorney, Agent, or Firm*—Peter A. Fowell

[57] ABSTRACT

Highly filled thermoplastic compositions useful as adhesive precoats for carpets are obtained by blending certain ethylene/vinyl acetate copolymers with above 60 wt. % filler and processing oil.

7 Claims, No Drawings

HIGHLY FILLED THERMOPLASTIC CARPET PRECOAT COMPOSITIONS

This is a continuation of application Ser. No. 07/784,244 filed Oct. 29, 1991, now abandoned.

BACKGROUND OF THE INVENTION

1. Field of the Invention

This invention relates to carpet, especially automobile carpet, precoat compositions and more particularly, it relates to highly filled hot-melt adhesive compositions based on defined ethylene/vinyl acetate copolymers made with selected telogens blended with processing oil.

2. Description of the Related Art

Tufted carpets typically have a layer of a polymeric composition on their backside. These polymeric compositions are commonly adhesives applied as a hot-melt. This polymeric backside layer provides various desirable characteristics to the carpet as a whole. Such characteristics will differ depending on the type of carpet. Industrial carpet requirements for instance are generally more stringent than domestic carpet requirements. Automotive carpet has different requirements again.

While such polymeric hot-melt adhesive layers can be applied directly to the backside of the carpet, the properties required of the backside layer often require a composition whose flow characteristics do not allow sufficient adhesion and 'wetting' of the carpet yarn bundles necessary to maintain the integrity of the carpet in use. An alternative is to use an intermediate 'precoat' adhesive layer between the carpet tufting and the 'main' backside layer. Such precoats are compositions designed to penetrate the tufts, wet the filaments of yarn bundles, and at the same time adhere to the main carpet backside layer. A precoat must be fluid enough to penetrate the bundles, yet have sufficient strength to provide good wear characteristics to the carpet.

Precoats for general carpet use may be any of a large number of polymers. Examples of such polymers are given in U.S. Pat. No. 3,684,600, where ethylene/vinyl acetate copolymers containing 15-35 weight percent ester are described as being especially preferred. Typically, these are compounded with wax which serves to lower the viscosity. For automotive carpet use, polyethylene and ethylene/vinyl acetate resin alone (without filler or other ingredients) have been used. The latter has superior adhesive qualities, and is particularly useful when the main layer is also based on a composition containing ethylene/vinyl acetate. However, ethylene/vinyl acetate resin is relatively expensive to use alone and attempts have been made to reduce costs by blending with high levels of cheap extenders such as fillers. As much as about 60 wt. % filler may be needed to provide an economically viable composition. But, fillers increase viscosity and it has heretofore not been found possible to obtain highly filled ethylene/vinyl acetate compositions with a suitable balance of fluidity and mechanical properties to serve as an adequate precoat.

U.S. Pat. No. 3,583,936 discloses a backsizing composition which can be used without a precoat, and approaches the fiber penetration properties of a precoat. The composition is preferably based on ethylene/vinyl acetate polymer. However, it may contain only up to 40 wt. filler. It also contains at least 10 wt. % wax and also other polymeric components all of which are expensive relative to filler cost.

The main carpet backside layer which provides other use characteristics to the carpet may also be based on filled ethylene/vinyl acetate copolymers. In the case of automotive carpet, for instance, these characteristics may include sound deadening and formability to the contours of the car as well as the overall 'hand' of the carpet. Sound deadening is achieved by using a very high filler content which may be as high as 70 wt. % of the total composition. Thus, a filled ethylene/vinyl acetate copolymer main backside layer composition has similar ingredients to compositions which are of interest in precoat layer compositions. Useful polymeric compositions for the main automotive carpet backside layer are described in U.S. Pat. No. 4,191,798 which is hereby incorporated by reference. Preferred compositions comprise a blend of ethylene/vinyl acetate, processing oil, and calcium carbonate or barium sulfate. While these compositions are ideal for the overall carpet requirements, they do not provide good bonding and wetting to the filaments in the fiber bundles because they are too viscous. As a result they cannot be used as the only backside layer. Melt indices of these main carpet backside compositions range from 1.79 to 9.65, whereas much higher melt indices, at least 60, are necessary for tuft penetration and wetting. Attempts to use a lower viscosity version of such compositions as the only backside layer by utilizing higher melt index ethylene/vinyl acetate polymeric components, have not proved successful, since properties become inadequate. As a result, lower viscosity precoats are generally used as an intermediate layer between the carpet tufts and the main carpet backside layer.

The mechanical properties required of a precoat adhesive material generally need not be quite so good as those of the main backside layer. As a result, despite unsuitability as a main backside coat, lower viscosity versions of such main backside layer composition have also been considered as a precoat. Such compositions would have the high filler necessary to lower cost, and, because of the overall composition similarity, would adhere well to the higher viscosity main backside layer. However, even as a precoat composition, such compositions have been found inadequate.

U.S. Pat. No. 4,434,261 discloses an extrudable, self supporting hot-melt adhesive sheet which has a melt index of 10 to 500 and may contain, amongst many other polymers, ethylene/vinyl acetate copolymer blended with 2-30 wt. % plasticizer and 20-80 wt. % filler. In the only example, a composition with 30 wt. % ethylene/vinyl acetate copolymer, 55 wt. % filler and 15 wt. % oil has a melt index of 76, and moderately good mechanical properties. There is no indication the compositions disclosed would provide adequate carpet precoat adhesives especially at filler levels above 60 wt. %. There is no disclosure that the ethylene/vinyl acetate copolymer used was made using any telogen.

There remains a strong need to provide a low viscosity ethylene/vinyl acetate based precoat adhesive which is inexpensive by virtue of very high levels of cheap filler, yet has adequate mechanical properties and which is especially suited for use in automotive carpets.

SUMMARY OF THE INVENTION

The present invention provides for highly filled, plasticized ethylene/vinyl acetate copolymer blends which have better mechanical properties than have been available heretofore. The key to the invention is the use of a special type of ethylene/vinyl acetate copolymer which has low viscosity and high crystallinity. These are obtained using chain transfer agents, (commonly referred to as telogens), which are substantially non-incorporating, that is they lower viscosity yet, unlike many common telogens, do not become incorporated into the polymer chain as a comonomer. As a result, they do not lower the level of crystallinity of ethylene/vinyl acetate copolymers. As a consequence, the polymers have a higher strength and stiffness than those made with the type of telogen which does become incorporated.

According to the present invention there is provided a composition useful as an adhesive precoat comprising a blend of (A) 18-28 wt. % total ethylene/vinyl acetate copolymer of at least one ethylene/vinyl acetate copolymer wherein at least 30 wt. % of the total ethylene/vinyl acetate copolymer is a copolymer with a melt index greater than 300 and prepared using a substantially non-incorporating chain transfer agent, and wherein the average vinyl acetate content of the total copolymer is from 20-32 wt. %, and wherein the vinyl acetate content of any one ethylene/vinyl acetate copolymer is from 10-40 wt. %, (B) 4-12 wt. % processing oil, (C) 60-80 wt. % filler and (D) up to 1 wt. % of an organic fatty acid, wherein the melt index of the blend is from 60 to 300.

Further provided according to the present invention are the above compositions in the form of a carpet precoat.

Still further provided according to the present invention is an automotive carpet, its backside comprising a precoat layer of the above composition and, a sound deadening main polymeric layer adhered to the precoat layer.

DETAILED DESCRIPTION OF THE INVENTION

Ethylene/vinyl acetate copolymers are well known as adhesives. Compared with polyethylene, copolymers with vinyl acetate have a degree of polarity which adds to their adhesive qualities. They are also more flexible than polyethylenes. Levels of above 10 wt. % vinyl acetate are generally needed to begin to manifest improved adhesivity and greater flexibility. At high levels of vinyl acetate such as above 40 wt. %, the polymer become very flexible, soft, and difficult to handle.

Preparation of ethylene/vinyl acetate copolymers is well known. U.S. Pat. No. 4,497,941, incorporated herein by reference, describes such preparation. The process is essentially a high pressure free radical polymerization carried out at temperatures between 130 and 250 C. Melt indices up to several thousand may be achieved by use of a telogen. The normal action of a telogen is to terminate a growing polymer chain and initiate another one. Several of the more inexpensive, effective, or convenient-to-use telogens however contain a polymerizable bond, and may, to a greater or lesser degree, become incorporated into the polymer as a further comonomer. Such is the case with isobutylene, described in U.S. Pat. No. 4,497,941 as a 'convenient' chain transfer agent, and which is the one used in the only example given. Other suitable telogens listed therein include hydrogen, acetone, butyraldehyde, cyclohexanone, butene-1, propylene, and butane. Of these, hydrogen, acetone, cyclohexanone and butane are examples of telogens which do not become significantly incorporated as a comonomer. Butene-1, isopropylene and propylene do become incorporated.

For lower viscosity, that is higher melt index, the more telogen is required. As a result, if an incorporating telogen is used, high melt index resins will have more of telogen as incorporated as comonomer. For a given melt index, the extent of incorporation depends on the relative rates of transfer and polymerization of the telogen. These, in turn, may depend not just on the particular telogen but on polymerization conditions such as temperature, pressure and level of the principle comonomer.

The exact extent to which a copolymerizable telogen is incorporated as a comonomer may vary significantly from one telogen to another. There appears to be no reliable data sufficient to predict the tendency to incorporate for any potentially copolymerizable telogen within the range of conditions under which ethylene/vinyl acetate copolymers may be prepared. It is quite possible that some telogens which contain a polymerizable bond would not incorporate to an appreciable extent under some polymerization conditions. On the other hand, telogens without a polymerizable bond can be reliably expected not to incorporate.

Acetone and propane are preferred as non-incorporating telogens. Acetone is especially preferred. In the blends described in illustrating this invention, acetone was employed as a non-incorporating telogen. In copolymers where acetone was not used, propylene was the telogen.

For the purposes of this disclosure, the term ethylene/vinyl acetate copolymer without further qualification is meant to embrace polymers which may be made with either type of telogen.

When a minor amount of chain transfer agent is used, there is little difference in the properties of the resulting polymer whether the telogen also acts as a comonomer or not. When lower viscosity, that is to say higher melt index, resins are considered, requiring higher levels of telogen, it has now been found that property differences can become increasingly significant for some telogens. Thus, with ethylene/vinyl acetate copolymers above about 250 melt index for example (measured using ASTM D1238 condition E), properties of copolymers made with propylene as telogen which incorporates, and acetone which does not, are significantly different. Even in highly filled blends containing less than 40 wt. % polymer, the performance of the blend is affected. This has been found to be particularly true in the carpet precoat blend adhesives of the present invention.

One might assume that when a telogen is also incorporated as a comonomer, any change in properties could be counteracted merely by decreasing the level of principle comonomer, vinyl acetate. However, in the highly filled precoat compositions tested in developing this invention, it was not possible to reduce vinyl acetate level and counter the effect of incorporated telogen. Each comonomer has its own effect.

In this investigation, it has been found that for suitable precoats, the ethylene/vinyl acetate copolymer component, which may contain several different ethylene/vinyl acetate copolymers, must contain at least 30 wt. % of an ethylene/vinyl acetate copolymer made with a substantially non-incorporating telogen, preferably greater than 40 wt. %, and most preferably greater than 50 wt. %. By substantially non-incorporating, it is meant that the agent has not become incorporated into the polymer as a comonomer to an extent greater than about 2 mole % in the final polymer. While such telogens will generally be those which do not incorporate at all, it is possible that certain of the potentially copolymerizable telogens may, under certain conditions, incorporate to only a very slight extent.

For economic viability, the precoat compositions of this invention require at least 60 wt. % of an inexpensive filler. While more filler reduces cost, above about 80 wt. % there will be a detrimental effect on properties. Preferably the filler level is from 65 to 75 wt. %. Fillers suitable for use in this invention are described in U.S. Pat. No. 4,191,798. Preferred fillers are barium sulfate and calcium carbonate. Calcium carbonate is especially preferred.

A plasticizer is also required, both to aid in the incorporation of the high filler levels used and to help lower the viscosity. From 4 to about 12 wt. % plasticizer should be used, preferably from 8 to 12 wt. %. Above about 12 wt. %, there will be a detrimental effect on the precoat properties. Of the available plasticizers, processing oils are most suitable. The desirable qualities in highly filled ethylene/vinyl acetate copolymers achieved by use of petroleum derived processing oils is discussed in detail in U.S. Pat. No. 4,191,798. Naphthenic and aromatic processing oils are especially preferred. Other plasticizers are known for use with ethylene/vinyl acetate copolymer based adhesives, and these are listed in U.S. Pat. No. 4,338,227. They include phthalates, azelates, adipates, tricresyl phosphate and polyesters such as those used in flexibilizing polyvinyl chloride, as well as low molecular weight resins made form alkylated phenols, phenol modified coumaroneindene, terpenes and synthetic terpenes. While petroleum derived processing oils are far preferred, the other plasticizers noted may be used.

The addition of certain organic fatty acids in small quantities can increase elongation, while reducing stiffness to a small degree. They can optionally be used in the precoat blends of this invention. Up to 1 wt. %, preferably 0.5 to 1 wt. % should be used. Suitable organic acids have been described in U.S. Pat. No. 4,434,258 which is hereby incorporated by reference. Preferred acids are palmitic, stearic and oleic acids, dimers and trimers thereof, and mixtures of these acids. Most preferred is stearic acid.

The ethylene/vinyl acetate copolymer component should have a melt viscosity such that when filler and plasticizer have been added, the final precoat blend melt index is from about 60 to 300. Below 60 melt index, the viscosity is too high to act as an effective precoat and penetrate the fibers within the fiber bundles sufficiently. Above about 300 melt index it has not been found possible to obtain blends which have adequate mechanical strength for precoat use. Preferably the melt index is between 100 and 250. This melt index depends on the melt index of the component polymer or polymers, the amount of filler and its characteristics, and the amount of plasticizer and its viscosity. For a given amount of filler and plasticizer, it is within the skill of the artisan to adjust the melt index of the copolymer component, to achieve the required blend melt viscosity.

It is possible to use either only one ethylene/vinyl acetate copolymer or a mix or several such copolymers in the precoat composition. If more than one copolymer is used, each component may differ in melt index or vinyl acetate content or both. If the copolymer component of the blend consists of one copolymer only, then it should be one made with a substantially non-incorporating telogen. If there is more than one component, then it is possible to use as little as 30 wt. % of a copolymer made with a substantially non-incorporating telogen, preferably above 40 wt. %, and most preferably above 50 wt. %. A mix of very low melt index and very high melt index resins may be used. Thus, it has been found possible to mix an ethylene/vinyl acetate copolymer with a melt index of 6 made with an incorporating telogen such as propylene with a resin with melt index as high as 2500 made with a non-incorporating telogen such as acetone and achieve satisfactory results. If a mixture of copolymers is to be used, then, if any one is made with an incorporating telogen it preferably should have a melt index of less than about 100. Minor amounts, less than about 5%, of resin made with incorporating telogen with higher than 100 melt index may be possible. While no upper limit to the melt index of a high melt index component of the ethylene/vinyl acetate copolymer mix has been established, it is generally preferred that such melt index not exceed about 3000.

The vinyl acetate content of the copolymer component of the precoat blend is also critical. As previously indicated, increasing the level of vinyl acetate in ethylene/vinyl acetate copolymers increases flexibility and decreases crystallinity. It also improves adhesive qualities. Both flexibility and crystallinity influence toughness, but often in a quite complex way. It has been found that the average vinyl acetate content of the total ethylene/vinyl acetate copolymer present should be between 20 and 32 wt. % for adequate properties. If the ethylene/vinyl acetate copolymer is a mix of more than one copolymer, the vinyl acetate content of each copolymer can be somewhat higher or lower than the limits for the average vinyl acetate content, but preferably should be between about 12 and 40 wt. %.

While a single copolymer can be used, it will be recognized that a degree of versatility is achieved by blending. Thus, when a moderate stable of resins is available, differing in vinyl acetate content and melt index, useful compositions can be obtained by mixing without the need for further resin preparation. It is not believed that there is a major difference or advantage whether a one, two or three component copolymer mix is used. It is believed however that if only one ethylene/vinyl acetate copolymer were to be used, then one made using a substantially non-incorporating telogen, with a melt index of about 300 to 500 and a vinyl acetate content of about 30–32% would be ideal.

As noted above, in the main backside layer in automotive carpets, filler is used for its sound deadening ability. In the precoat compositions of this invention, its purpose is primarily to achieve economic viability. It will be recognized however, that the filler will act as a sound deadener in the precoat in proportion to its content in the precoat and to the thickness of the precoat used. Hot-melt precoats and the main backside layer can vary significantly in thickness depending on the particular requirements of the carpet. While precoats can form a layer as low as 1 oz./square yard of carpet, when unfilled ethylene/vinyl acetate copolymers are used in automotive carpets, typically about 10 oz./square yard are used. With the filled precoats of this invention, generally from 10 to 20 oz./square yard will be required. The sound deadening main backside layer in automotive carpets varies widely. Layers from 20–100 oz./square yard have been used. To the extent that the precoat adhesives of this invention contain a sound deadening filler, a decrease in the thickness of the main sound deadening layer should be possible.

Preparation of the blends is achieved in substantially the same way as in U.S. Pat. No. 4,191,798. The blending of resin or resins, filler, oil and optional components is achieved using high intensity mixing at temperatures of from 150 to 180 C. A commercial-size Banbury batch type mixer is suitable, while a continuous mixer such as a Farrel continuous mixer is especially preferred.

Tensile properties of a blend composition are a useful guide in determining its utility as a precoat. In general, the higher the tensile strength and tensile elongation of the polymer component, the higher are those of the blend. When the tensile elongation of the adhesive precoat blend is below about 100%, the composition is unacceptable. Tensile strengths of above about 100 psi are also generally required. Flexibility per se. is less important, but at a flexural modulus of below about 2500 psi, handling becomes difficult. However, there is a general trend towards decreased elongation as the flexibility of the blend decreases, that is, when the flexural modulus increases.

The invention is now illustrated in the following examples. Flexural modulus is measured using ASTM D791. Tensile Strength, Yield Strength and Tensile Elongation are measured using ASTM D1708 at a crosshead speed of 2 in./min. Melt Index is measured using ASTM D1238 using a weight of 2190 g. at 190 C. (condition E). For convenience, EVA and VA are used to denote ethylene/vinyl acetate copolymer and vinyl acetate monomer respectively. ECC calcium carbonate used was grade CC103 Mfg. by English China Clay Co. (America). 'Sunthene' Processing Oil is a naphthenic processing oil manufactured by Sun Oil Co. 'Industrene' B is stearic acid also manufactured by Sun Oil Co. 'Hyprene' processing oil is manufactured by Sun Oil Co.

EXAMPLE 1

This example illustrates a blend made using two EVA copolymers as the copolymer component of the blend. A blend of the following ingredients was prepared using a Brabender batch type mixer, at 150 C. for five minutes: 13 wt. % EVA made using propylene as telogen with an MI=6 and 28 wt. % VA; 8.3 wt. % EVA made using acetone as telogen with an MI=1900 and 19 wt. % VA; 8.4 wt. % "Hyprene" processing oil; 0.3 wt. % "Industrene"-B stearic acid and 70 wt. % ECC calcium carbonate filler. The blend had the following properties: Ultimate Tensile Strength 234 psi, Tensile Elongation 535%, Flexural modulus 2900 psi and melt index 70. These properties are generally suitable for a carpet precoat composition.

EXAMPLE 2

This example illustrates another two component blend but made with different resins from Example 1. A blend was prepared as in Example 1 except that the copolymer component consisted of a mixture of 11.5 wt. % EVA made with propylene as telogen, an MI=8 and 18 wt. % VA; 9.8 wt. % EVA made using acetone as telogen, an MI=650 and 28% VA. Other components were in the same percentages as in Example 1. The blend had an Ultimate Tensile Strength of 200 psi, a Tensile Elongation of 210%, a Flexural Modulus of 4100 psi. and a melt index of 75. This example shows that quite different polymer components can be used to achieve useful compositions. Properties are well within the acceptable range. The stiffness as measured by flexural modulus is somewhat higher, and elongation somewhat lower.

EXAMPLE 3

This example illustrates use of a blend of three resins as copolymer component. The blend was prepared as in Example 1, and had the following composition: 9.14 wt. % EVA made using propylene telogen, an MI=6 and 28 wt. % VA; 5.19 wt. % EVA made using acetone as telogen, an MI=2500 and 28 wt. % VA; 10.37 wt. % EVA made using acetone as telogen, an MI=800 and 28 wt. % VA, 5 wt. % "Sunthene" 4240 processing oil, 0.3 wt. % "Industrene"-B, and 70 wt. % ECC calcium carbonate. Properties were as follows. Ultimate tensile strength 139 psi, Tensile Elongation, 402%, Flexural Modulus 4768 psi, and a melt index of 83. Note that despite the fact that all copolymer components had 28% VA, and hence average VA was also 28%, and the blend had only 5% processing oil, stiffness was high and elongation good. Except for the constant level of filler, the compositions of Examples 1,2, and 3 are quite different, within the limits of the invention, yet all have acceptable properties. In this example stiffness is higher, even though the average VA content in the copolymer is higher than in the previous examples. This is partly a result of using a high proportion of resin prepared using a non-incorporating telogen, and partly a result of lower oil.

EXAMPLE 4

This example shows that even though the blend copolymers are chosen to give a much higher melt index in the blend, properties can still be suitable for a precoat composition. The blend was prepared as in Example 1 with the following ingredients: 7.78 wt. % EVA made using propylene as telogen, an MI=6 and 28 wt. % VA; 8.46 wt. % EVA made using acetone as telogen, an MI=2500 and 28% VA; 8.46 wt. % EVA made using acetone as telogen, an MI=800 and 28% VA, with filler and oil as in Example 3. The blend had an Ultimate Tensile Strength of 148 psi, a Tensile Elongation of 347%, a Flexural Modulus of 5105 psi, and a melt index of 224.

COMPARATIVE EXAMPLE 1

This example shows that when the final blend has a melt index greater than 300, elongation drops drastically. The blend was prepared as in Example 1, Blend ingredients were identical to those in Example 4 except for the relative amounts of EVA copolymer components. The copolymer components were as follows: 3.22 wt. % of the EVA made using propylene as telogen, an MI=6 and 28 wt. % VA; 10.74 wt. % of the EVA made using acetone as telogen, an MI=2500 and 28% VA and 10.74 wt. % of the EVA made using acetone as telogen, an MI=800 and 28 wt. % VA. Melt index of the blend was 321, Ultimate Tensile Strength was 138 psi, Flexural modulus was 4516 psi and Tensile Elongation was only 7%.

COMPARATIVE EXAMPLE 2

This example shows that, even though the copolymer component has a high proportion of copolymer made using a non-incorporating telogen, when the vinyl acetate level is too low elongation drops below acceptable levels. The blend was prepared as in Example 1, with the following ingredients: 9.76 wt. % EVA made using propylene as telogen, an MI=8 and 18 wt. % VA; 7.48 wt. % EVA made using acetone as telogen, an MI=2500 and 14 wt. % VA; 7.46 wt. % EVA made using acetone as telogen, an MI=800 and 18 wt. % VA; 5 wt. % "Sunthene" 4240 processing oil; 0.3 wt. % "Industrene"-B, and 70 wt. % ECC calcium carbonate. The blend had an Ultimate Tensile Strength of 230 psi, but a Tensile Elongation of only 9% and a Flexural Modulus of 9317 psi. Melt Index of the blend was 85.

COMPARATIVE EXAMPLE 3

This example had as its copolymer component a blend of two resins both made with propylene telogen. The composition was as follows: 9.37 wt. % EVA, an MI=40 and 28 wt. % VA; 11.93 wt. % EVA, an MI=500 and 18 wt. % VA; with the remaining ingredients (oil, stearic acid and calcium carbonate) as in Example 1. Melt index of the blend was 178, Ultimate tensile Strength was 137 psi, Flexural Modulus was 4900, but Tensile Elongation was only 17%.

COMPARATIVE EXAMPLE 4

This example used a single EVA resin made with propylene as telogen. It consisted of 24.7 wt. % EVA, an MI=400 and 28% VA. Filler, calcium carbonate and oil were the same as in Example 1. Ultimate Tensile Strength was 156 psi, melt index of the blend was 278, but, while the resin was very flexible with a Flexural Modulus of only 2400 psi, Tensile Elongation was 0%.

I claim:
1. A precoat composition comprising a blend of
   (A) 18-28 wt. % total ethylene/vinyl acetate copolymer comprising at least one ethylene/vinyl acetate copolymer wherein at least 30 wt. % of the total ethylene/vinyl acetate copolymer is an ethylene/vinyl acetate copolymer with a melt index of greater than 300, prepared using a substantially non-incorporating chain transfer agent, selected from the group consisting of acetone and propane, wherein the average vinyl acetate content of the total ethylene/vinyl acetate copolymer is from 20-32 wt. %, and wherein the vinyl acetate content of any one ethylene/vinyl acetate copolymer is from 10 to 40 wt. %,
   (B) 4-12 wt. % processing oil,
   (C) 60-80 wt. % of a filler,
   (D) 0-1 wt. % of an organic acid selected from stearic, oleic, palmitic and dimers and trimers thereof, wherein the melt index of the blend is from 60 to 300; the total of (A), (B), (C), (D) equalling 100%.
2. The composition of claim 1 wherein the filler is present in an amount of from 65-75 wt. %.
3. The composition of claim 1 wherein said filler is calcium carbonate and said organic acid is stearic acid.
4. The composition of claim 1 wherein component (A) comprises two or more ethylene/vinyl acetate copolymers.
5. A carpet precoat comprising the composition of claim 1.
6. A carpet having on its backside, a layer of the precoat of claim 1 in an amount of from 10-20 oz. per square yard of carpet, and a further layer adhered to the underside of the precoat.
7. An automotive carpet comprising the carpet of claim 6, wherein the said further layer is a sound deadening polymeric composition.

* * * * *